US008656463B2

(12) United States Patent
Callahan et al.

(10) Patent No.: US 8,656,463 B2
(45) Date of Patent: Feb. 18, 2014

(54) DETERMINING A TRUST LEVEL OF A USER IN A SOCIAL NETWORK ENVIRONMENT

(75) Inventors: Ezra Callahan, Palo Alto, CA (US); Aditya Agarwal, San Francisco, CA (US); Charlie Cheever, Palo Alto, CA (US); Chris Putnam, Palo Alto, CA (US); Bob Trahan, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 145 days.

(21) Appl. No.: 12/900,430

(22) Filed: Oct. 7, 2010

(65) Prior Publication Data

US 2011/0035789 A1 Feb. 10, 2011

Related U.S. Application Data

(62) Division of application No. 11/701,595, filed on Feb. 2, 2007.

(51) Int. Cl.
*G06F 21/00* (2013.01)
*H04L 29/06* (2006.01)
*G06Q 50/00* (2012.01)
*H04L 29/08* (2006.01)

(52) U.S. Cl.
CPC .............. *H04L 63/104* (2013.01); *H04L 67/30* (2013.01); *G06Q 50/01* (2013.01)
USPC ................................................ 726/4; 726/26

(58) Field of Classification Search
CPC ...................... H04L 63/08; H04L 67/30
USPC .................... 713/165–167; 726/2–4, 26–33; 709/223–225
See application file for complete search history.

(56) References Cited

U.S. PATENT DOCUMENTS

| 5,937,413 | A | 8/1999 | Hyun et al. |
| 6,029,141 | A | 2/2000 | Bezos et al. |
| 7,013,292 | B1 | 3/2006 | Hsu et al. |
| 7,249,123 | B2 | 7/2007 | Elder et al. |
| 7,269,590 | B2 | 9/2007 | Hull et al. |
| 7,353,199 | B1 | 4/2008 | DiStefano |
| 7,802,290 | B1 * | 9/2010 | Bansal et al. ............... 726/3 |
| 2001/0037721 | A1 | 11/2001 | Hasegawa et al. |

(Continued)

OTHER PUBLICATIONS

CHIPIN.com, "How ChipIn Works: An Overview," Dec. 15, 2006. [Online] [Retrieved Jun. 20, 2008] Retrieved from the Internet <URL:http://web.archive.org/web/20061215090739/www.chipin.com/overview.>.

(Continued)

*Primary Examiner* — Gilberto Barron, Jr.
*Assistant Examiner* — David Le
(74) *Attorney, Agent, or Firm* — Fenwick & West LLP (57) ABSTRACT

A system and method for determining a trust level for a non-approved user in a social network is described. The method includes monitoring requests for social network interactions between an approved user and the non-approved user and determining if each interaction requested is of a first type or a second type. The method further includes increasing a first trust value when the interaction requested is of the first type and increasing a second trust value when the interaction requested is of the second type. The method further includes determining the trust level based on the first trust value and the second trust value. The method further includes changing the status of the non-approved user to an approved user based on the trust level, the first trust value and/or the second trust value.

25 Claims, 6 Drawing Sheets

(56) References Cited

U.S. PATENT DOCUMENTS

| | | |
|---|---|---|
| 2002/0019739 A1 | 2/2002 | Juneau et al. |
| 2002/0029350 A1* | 3/2002 | Cooper et al. ............... 713/200 |
| 2002/0046243 A1 | 4/2002 | Morris et al. |
| 2002/0059201 A1 | 5/2002 | Work |
| 2003/0061503 A1* | 3/2003 | Katz et al. .................. 713/200 |
| 2003/0145093 A1 | 7/2003 | Oren et al. |
| 2003/0222918 A1 | 12/2003 | Coulthard |
| 2003/0225632 A1 | 12/2003 | Tong et al. |
| 2004/0003283 A1 | 1/2004 | Goodman et al. |
| 2004/0024846 A1 | 2/2004 | Randall et al. |
| 2004/0088177 A1 | 5/2004 | Travis et al. |
| 2004/0148275 A1 | 7/2004 | Achlioptas |
| 2005/0015488 A1* | 1/2005 | Bayyapu ...................... 709/225 |
| 2005/0021750 A1 | 1/2005 | Abrams |
| 2005/0097319 A1 | 5/2005 | Zhu et al. |
| 2005/0108520 A1* | 5/2005 | Yamamoto et al. ........... 713/155 |
| 2005/0114759 A1 | 5/2005 | Williams et al. |
| 2005/0154639 A1 | 7/2005 | Zetmeir |
| 2005/0159970 A1 | 7/2005 | Buyukkokten et al. |
| 2005/0171799 A1 | 8/2005 | Hull et al. |
| 2005/0171955 A1 | 8/2005 | Hull et al. |
| 2005/0177385 A1 | 8/2005 | Hull et al. |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198305 A1 | 9/2005 | Pezaris et al. |
| 2005/0203807 A1 | 9/2005 | Bezos et al. |
| 2005/0216300 A1 | 9/2005 | Appelman et al. |
| 2005/0216550 A1 | 9/2005 | Paseman et al. |
| 2005/0235062 A1 | 10/2005 | Lunt et al. |
| 2005/0256756 A1 | 11/2005 | Lam et al. |
| 2005/0289650 A1 | 12/2005 | Kalogridis |
| 2006/0041543 A1 | 2/2006 | Achlioptas |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0080613 A1 | 4/2006 | Savant |
| 2006/0085419 A1 | 4/2006 | Rosen |
| 2006/0136419 A1 | 6/2006 | Brydon et al. |
| 2006/0143183 A1 | 6/2006 | Goldberg et al. |
| 2006/0161599 A1 | 7/2006 | Rosen |
| 2006/0184617 A1 | 8/2006 | Nicholas et al. |
| 2006/0184997 A1 | 8/2006 | La Rotonda et al. |
| 2006/0190281 A1 | 8/2006 | Kott et al. |
| 2006/0194186 A1 | 8/2006 | Nanda |
| 2006/0218225 A1 | 9/2006 | Hee Voon et al. |
| 2006/0229063 A1 | 10/2006 | Koch |
| 2006/0230061 A1 | 10/2006 | Sample et al. |
| 2006/0247940 A1 | 11/2006 | Zhu et al. |
| 2006/0248573 A1 | 11/2006 | Pannu et al. |
| 2006/0256008 A1 | 11/2006 | Rosenberg |
| 2006/0265227 A1 | 11/2006 | Sadamura et al. |
| 2006/0293976 A1 | 12/2006 | Nam |
| 2007/0005683 A1 | 1/2007 | Omidyar |
| 2007/0043947 A1 | 2/2007 | Mizikovsky et al. |
| 2007/0061405 A1 | 3/2007 | Keohane et al. |
| 2007/0099609 A1 | 5/2007 | Cai |
| 2007/0174389 A1 | 7/2007 | Armstrong et al. |
| 2007/0179905 A1 | 8/2007 | Buch et al. |
| 2007/0208613 A1* | 9/2007 | Backer ........................... 705/10 |
| 2007/0208916 A1 | 9/2007 | Tomita |
| 2007/0282987 A1 | 12/2007 | Fischer et al. |
| 2008/0005076 A1 | 1/2008 | Payne et al. |
| 2008/0010343 A1 | 1/2008 | Escaffi et al. |
| 2008/0033776 A1 | 2/2008 | Marchese |
| 2008/0040428 A1 | 2/2008 | Wei et al. |
| 2008/0059992 A1 | 3/2008 | Amidon et al. |
| 2008/0070697 A1 | 3/2008 | Robinson et al. |
| 2008/0077581 A1 | 3/2008 | Drayer et al. |
| 2008/0086458 A1 | 4/2008 | Robinson et al. |
| 2008/0115226 A1* | 5/2008 | Welingkar et al. .............. 726/28 |

OTHER PUBLICATIONS

Flores, F. et al., "Computer Systems and the Design of Organizational Interaction," *ACM Transactions on Information Systems*, Apr. 1988, pp. 153-172, vol. 6, No. 2.

Parzek, E. "Social Networking to ChipIn to a Good Cause," Business Design Studio, Jun. 29, 2006. [Online] [Retrieved Jun. 20, 2008] Retrieved from the Internet <URL:http://www.businessdesignstudio.com/resources/blogger/2006.06social-networking-tochipin-to-good.html.>.

PCT International Search Report and Written Opinion, PCT Application No. PCT/US2007/02822, Feb. 14, 2008, eight pages.

* cited by examiner

DETERMINING A TRUST LEVEL OF A USER IN A SOCIAL NETWORK ENVIRONMENT

CROSS-REFERENCE TO RELATED APPLICATIONS

This application is a divisional of co-pending U.S. application Ser. No. 11/701,595, filed Feb. 2, 2007, which is incorporated by reference in its entirety.

BACKGROUND OF THE INVENTION

1. Field of the Invention

The present invention relates generally to social networks, and more particularly to systems and methods for determining a trust level of users.

2. Description of Related Art

Various social network websites have developed systems for determining the identity of a user requesting access to other users. For example, the website may match a user ID with a password. Once the user has been identified, the website may grant the user access to the other users according to various access rules. However, the access rules are generally based on some interaction between the website and the user or the website and a third party, such as a system administrator.

In some social network websites, a user can limit access to their own webpage and communications from other users according to various security rules. However, such limits are generally based on an interaction between the website and the user who establishes or selects the security rules and identifies the other users to whom the rules will apply. Unfortunately, many users are generally not in position to determine if a new user can be trusted not to abuse communications and access to their webpage by, for example, sending spam or harassing emails to them. Moreover, the website administrator may also not be in position to determine if a new user can be trusted not to abuse access to the social network. On the other hand, if the barriers to new users are too high, then otherwise valuable new members for the social network will be deterred from joining and growth of the social network will be adversely effected. What is needed is a method for determining the trustworthiness of new users in a social network website not to abuse other users of the social network.

SUMMARY OF THE INVENTION

The present invention includes systems and methods for monitoring interactions between an approved user and a user who is new or otherwise non-approved in a social network environment. A trust level may be determined for the non-approved user based on the approved user's actions toward the non-approved user. The trust level may be based on a combination of trust values determined for each of two or more types of interactions. For example, one type of interaction can be receiving a friendship invitation from an approved user, and another type of interaction can be the approved user tagging a photo of the non-approved user. The trust value for each particular type of interaction may be determined independently. For example, a trust value for friends may be incremented for each new friendship invitation, and a trust value for tags may be incremented for each photo of the non-approved user tagged. The trust level may be the sum of the trust value for friends and the trust value for tags or some other combination of the trust values. The trust level may also be subject to a minimum trust value for friends and/or a minimum trust value for tags. When the trust level increases to a predetermined level, the non-approved user may become an approved user and, as such, may similarly contribute to conferring trust on non-approved users.

In some embodiments, the method further includes subjecting the non-approved user to impediments to communications within the social network, based on the trust level. As the trust level increases, the impediments may decrease. For example, the non-approved user may be required to respond to a challenge in the form of a Completely Automated Public Turing test to tell Computers and Humans Apart (CAPTCHA) with each request for communication in the social network. As the trust level of the non-approved user increases, the frequency of the CAPTCHA challenge may be reduced, for example, to every third request or some other selection. Alternatively, the probability of presenting the CAPTCHA challenge on a given request may be reduced, for example, to 30% or some other percentage.

In some embodiments, the non-approved user may acquire trust by providing a telephone number under control of the non-approved user. The telephone number may be verified as under the non-approved user's control when a message sent to the telephone number is correctly returned by the non-approved user.

In some embodiments, a method for determining a trust level for a non-approved user in a social network is described. The method includes receiving a request for an interaction from an approved user regarding the non-approved user, determining if the interaction requested is of a first type, and modifying a first trust value for the non-approved user when the interaction requested is of the first type. The method further includes determining if the interaction requested is of a second type and modifying a second trust value for the non-approved user when the interaction requested is of the second type. The method further includes determining a trust level for the non-approved user based on the first trust value and the second trust value.

DETAILED DESCRIPTION

Figure 1:
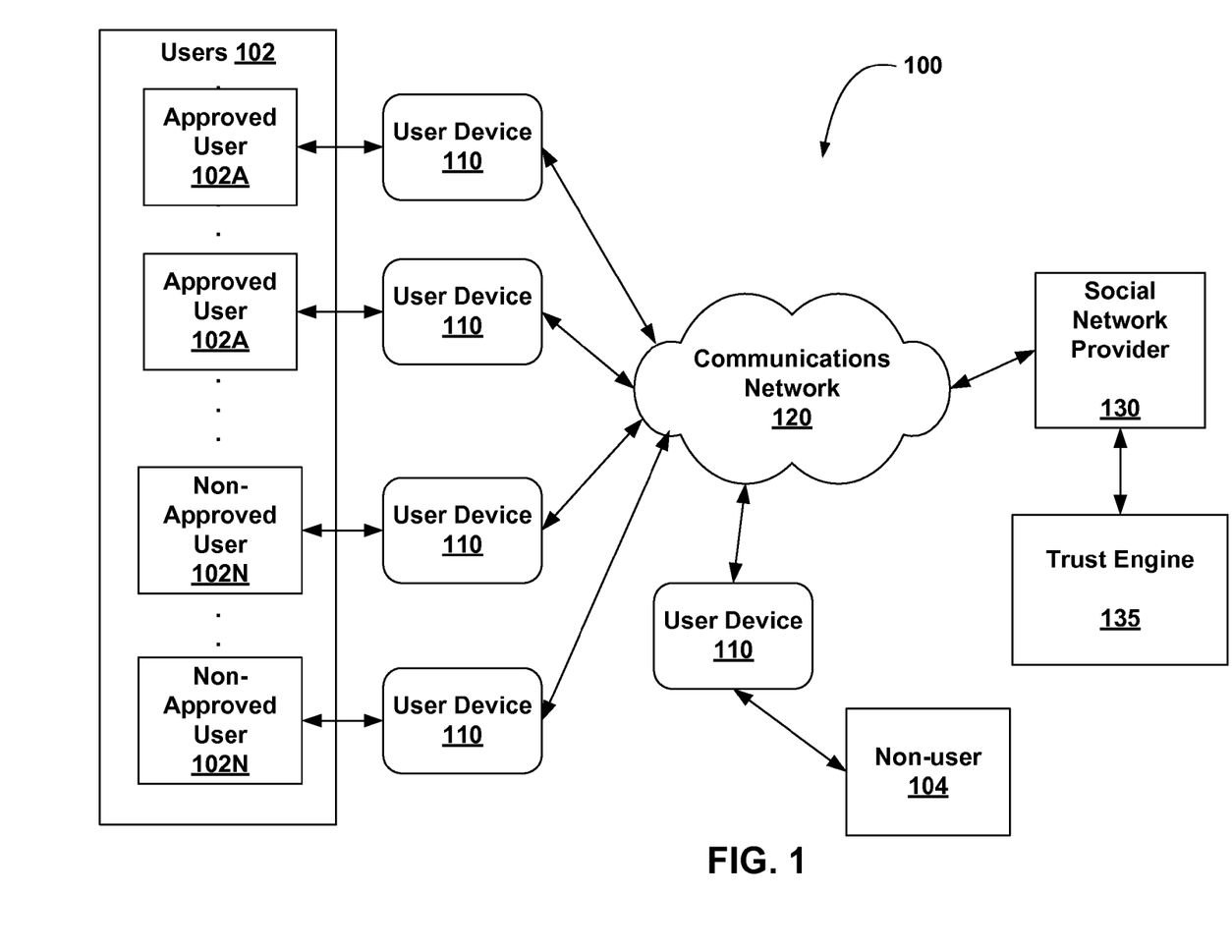
FIG. 1 illustrates an exemplary social network environment in which a trust level may be determined.

FIG. 1 illustrates an exemplary social network environment 100 in which a trust level may be determined. One or more users 102, at user devices 110, are coupled to a social network provider 130 via a communications network 120. Users 102 may be approved users 102A or non-approved users 102N. In various embodiments, user devices 110 include a computer terminal, a personal digital assistant (PDA), a wireless telephone, a digital camera, etc. In various embodiments, the communications network 120 includes a local area network (LAN), a wide area network (WAN), a wireless network, an intranet, the internet, and so forth. Non-approved users 102N may be new users 102 or formerly approved users 102A who have lost their level of trust due to activities deemed unacceptable by the social network provider 130.

The social network provider 130 is an entity or person that provides social networking services, which may include communication services, dating services, company intranets, online games, and so forth. For example, the social network provider 130 may host a website that allows two or more users 102 to communicate with one another via the website. The social network environment 100 may offer a user 102 an opportunity to connect or reconnect with other users 102 who attended, for example, the same high school or university. In some embodiments, a social network environment 100 includes a segmented community. A segmented community according to one embodiment is a separate, exclusive or semi-exclusive social network environment 100, or social network environment 100 wherein each user 102 who is a segmented community member may access and interact with other members of their respective segmented community.

The social network environment 100 may further offer users 102 an opportunity to connect or reconnect with one or more non-users 104 outside the social network environment 100. A non-user 104 at a user device 110 may be coupled to the social network provider 130, via the communications network 120.

The social network environment 100 further includes a trust engine 135 configured to determine trust levels for users 102. In some embodiments, the trust engine 135 determines trust levels for non-approved users 102N based on interactions between approved users 102A and non-approved users 102N within the social network environment 100. Examples of such interactions include an approved user 102A extending an invitation to a non-approved user 102N to become a friend, accepting an invitation from the non-approved user 102N to be a friend, tagging a photo of the non-approved user 102N, confirming a photo tag created by the non-approved user 102N, posting a message on the wall of the non-approved user 102N, poking the non-approved user 102N, and so forth. In some embodiments, the trust engine 135 is configured to determine the trust level for non-users 104 based on interactions between approved users 102A and non-users 104. The systems and methods used for determining trust levels for non-approved users 102N may likewise apply to determining trust for non-users 104.

Figure 2:
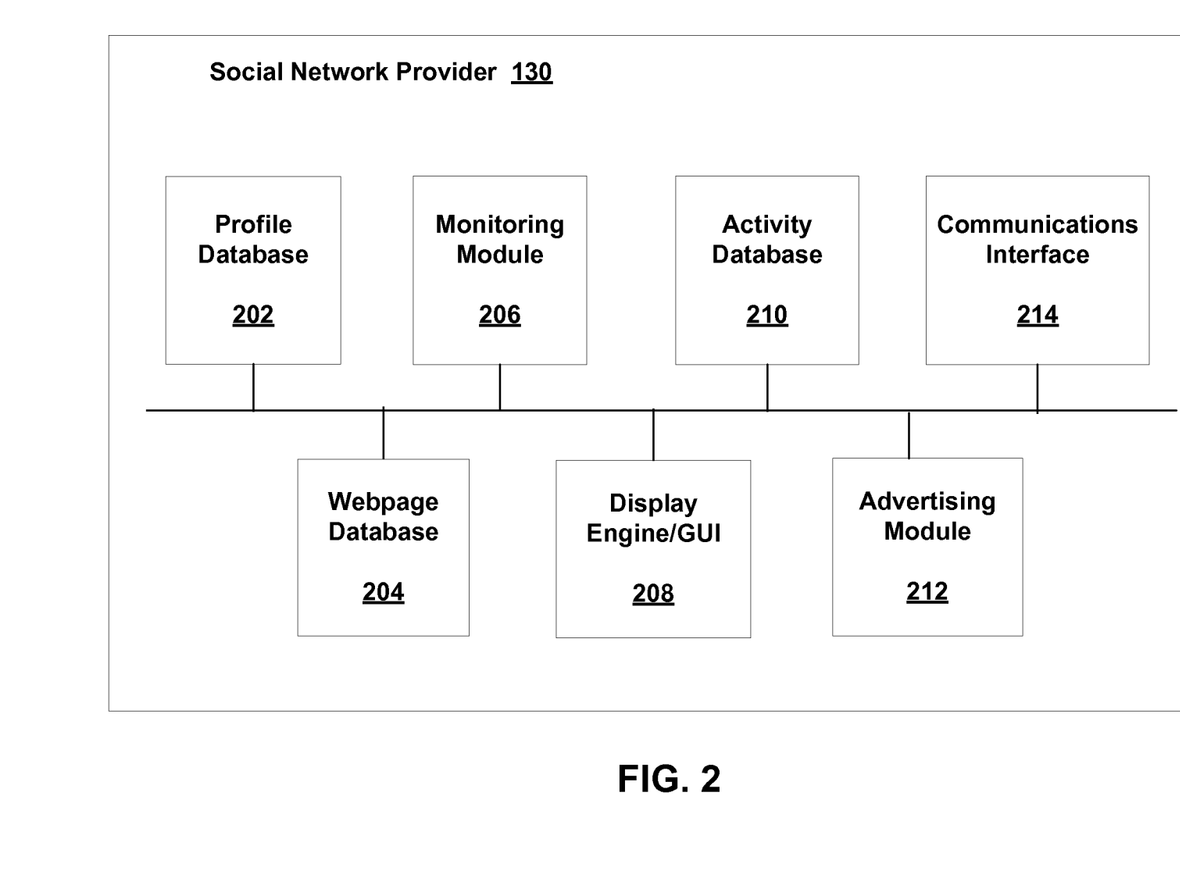
FIG. 2 is a block diagram of an exemplary social network provider, such as the social network provider shown in FIG. 1.

Referring now to FIG. 2, a block diagram of an exemplary social network provider, such as the social network provider 130 shown in FIG. 1, is shown. The social network provider 130 includes a profile database 202, a webpage database 204, a monitoring module 206, a display engine/GUI 208, an activity database 210, an advertising module 212, and communications interface 214. Although the social network provider 130 is described as being comprised of these components, fewer or more components may comprise the social network provider 130 and still fall within the scope of various embodiments.

The profile database 202 is provided for storing data associated with each of the users 102, including approved users 102A and non-approved users 102N. When a user 102 subscribes to services provided by the social network provider 130, a user profile may be generated for the user. For example, each user 102 may select privacy settings, provide contact information, provide personal statistics, specify memberships in various organizations, indicate interests, list affiliations, post class schedules, detail work activities, or group other users 102 according to one or more categories. When the user 102 adds additional information to the user profile, for example, by adding additional albums, the user profile in the profile database 202 may be updated with icons of the additional albums. The user profile may be stored in any storage medium. A timestamp may be associated with the user profile and may indicate order of occurrence in the profile database 202, date, time of day of the event, etc.

According to some embodiments, the user profile is created outside of the social network environment 100 and provided to the profile database 202 for local access by the social network provider 130. Alternatively, the profile database 202 is located remotely and accessed by the social network provider 130.

The webpage database 204 is configured to store media belonging to a user 102 and provide the media for display on a webpage belonging to the user 102. The webpage database 204 may be further configured to provide the media for display to other users 102 and/or to receive media from other users 102 via the webpage. The media may include photos, audio clips, text, video, animations, hyperlinks, and so forth.

The media may be organized in the webpage database 204. For example, photos and/or videos may be grouped in photo albums. A wall may include messages posted by the user 102 and/or by other users 102. Audio may be grouped in audio albums. The webpage database 204 may further organize groups according to news feeds and/or mini-feeds. See, e.g., U.S. patent application Ser. No. 11/503,242, filed on Aug. 11, 2006 entitled "System and Method for Dynamically Providing a News Feed About a User of a Social Network," and U.S. patent application Ser. No. 11/503,037, filed on Aug. 11, 2006 entitled "System and Methods for Providing Dynamically Selected Media Content to a User of an Electronic Device in a Social Network Environment, which are hereby incorporated herein by reference. Other groupings may include friends, shares, notes, groups, events, messages, web logs (blogs), and so forth.

In some embodiments, a photo stored in the webpage database 204 may be "tagged." Tagging a photo displayed on the webpage includes selecting a region of the photo and associating a user 102 with the region. A "tag" is an association between the region of the photo and the user 102. The photo and/or the associated user 102 are said to be "tagged." The user 102 may tag a photo on the user's own webpage or may tag a photo on another user's webpage. When another user 102 is tagged notice of the tag may be sent to the tagged user 102. The tagged user 102 may confirm the tag, acknowledging that he or she is the person tagged in the photo. Alternatively, the tagged user 102 may deny the tag, denying that he or she is the person tagged in the photo. See, e.g., U.S. patent application Ser. No. 11/580,210, filing on Oct. 11, 2006 entitled "System and Method for Tagging Digital Media," which is hereby incorporated herein by reference. The tag may be stored in the webpage database 204.

In some embodiments, a message may be posted to a "wall" belonging to a user 102. The wall is a region on the webpage dedicated to displaying messages. The messages may be posted to the wall by the owner of the webpage or by other users 102. The messages may include text and/or other media. A message, along with the identity of the user 102 who posted the message and the user 102 on who's wall the message was posted, may be stored in the webpage database 204.

In some embodiments, a first user 102 may "poke" another user by sending message that includes the address of the first user 102, but no text or other media. The other user may respond to being poked by sending a return message, by poking the first user, or by ignoring the first user.

The monitoring module 206 tracks the activities of one or more users 102 on the social network environment 100. For example, the monitoring module 206 can track an interaction between an approved user 102A and a non-approved user 102N. As above, examples of an interaction include extending an invitation to the non-approved user 102N to become a friend, accepting an invitation from the non-approved user 102N to become a friend, tagging a non-approved user 102N, confirming a tag by non-approved user 102N, posting a message on the wall of a non-approved user 102N, poking the non-approved user 102N, responding to a poke from a non-approved user 102N, and so forth. Any type of user activity can be tracked or monitored via the monitoring module 206. The information, digital media (e.g., digital images), people, groups, stories, and so forth, with which the user 102 interacts, may be represented by one or more objects, according to various embodiments. The monitoring module 206 may determine an affinity of the user 102 for subjects, other user's 102 digital images, relationships, events, organizations, and the like, according to users' 102 activities. See, e.g., U.S. patent application Ser. No. 11/503,093, filed on Aug. 2, 2006 entitles "Systems and Methods for Measuring User Affinity in a Social Network Environment," which is hereby incorporated herein by reference. The tag may be stored in the webpage database 204.

The display engine/GUI 208 displays the one or more items of digital media (e.g., digital images), profile information, and so forth, to users 102. Users 102 can interact with the social network provider 130 via the display engine/GUI 208. For example, users 102 can select albums, access individual digital images, tag other users' 102 digital images, post messages on user's 102 walls, poke users 102, and so forth, via the display engine/GUI 208.

The activity database 210 is configured to store activity data about each user 102. The activities may be tracked by the monitoring module 206. Activities monitored by the monitoring module 206 may be stored in the activity database 210. Activity entries in the activity database 210 may include the type of activity, the identity of the user 102 initiating the activity, identities of one or more other users 102 who are objects of the activity, a timestamp indicating time and date of the activity, and the like. Activity entries may be stored in multiple databases, including the activity database 210, the profile database 202, and so forth. Examples of types of activity entries that may be stored in the activity database 210 include tagging a digital image, confirming a tag, extending an invitation to become a friend, accepting an invitation to become a friend, poking a user 102, posting a message on a user's wall, and so forth. For example, an entry in the activity database 210 may record that a digital image was tagged by a non-approved user 102N at 15:12 on March 31 and that the tagged user, an approved user 102A, confirmed the tag at 9:02 on April 1.

According to various embodiments, one or more networks of users are provided within the social network environment 100. For example, user 102 may be in network comprised of other users 102 who are grouped according to a university attended, according to the user's geographical location or residence, according to a common field of work, according to a particular business, and so forth.

The advertising module 212 is configured to provide advertising to users 102 via the communications interface 214 and/or the display engine/GUI 208. The advertising module 212 may determine appropriate advertising using the profile database 202, the monitoring module 206, and/or the activity database 210. For example, the monitoring module 206 may communicate to the advertising module 212 that a non-approved user 102N has invited an approved user 102A to be a friend. The advertising module 212 selects the advertising according to the profile of the approved user 102A and/or the non-approved user 102N in the profile database 202, and displays the advertising to the non-approved user 102N via the display engine/GUI 208. Since the non-approved user 102N is likely to check the display periodically to determine if the invitation has been accepted, the advertising module 212 may vary the selection of the advertising from time to time.

The communications interface 214 is configured to communicate with users 102, such as via user devices 110 over the communications network 120. A user device 110 communicates various types of information, such as digital media (e.g., digital images), a request to another user 102 to become a friend, a notice of tagging another user 102, posting messages to the wall of another user 102, poking another user 102, and so forth, to the social network provider 130 via the communications interface 214. Any type of communications interface 214 is within the scope of various embodiments.

Any type of network may be provided by the social network provider 130. In other words, a network may comprise people grouped according to any type of category, such as networks grouped according to "friends," "geographical location," and so forth. The users 102 may specify the networks, the categories, subcategories, and so forth and/or these may be predetermined by the social network provider 130. The networks, categories, the subcategories, and so forth, may comprise a relationship with the user 102, as discussed herein, but do not necessarily comprise the only relationship user 102 has with the other users 102.

Figure 3:
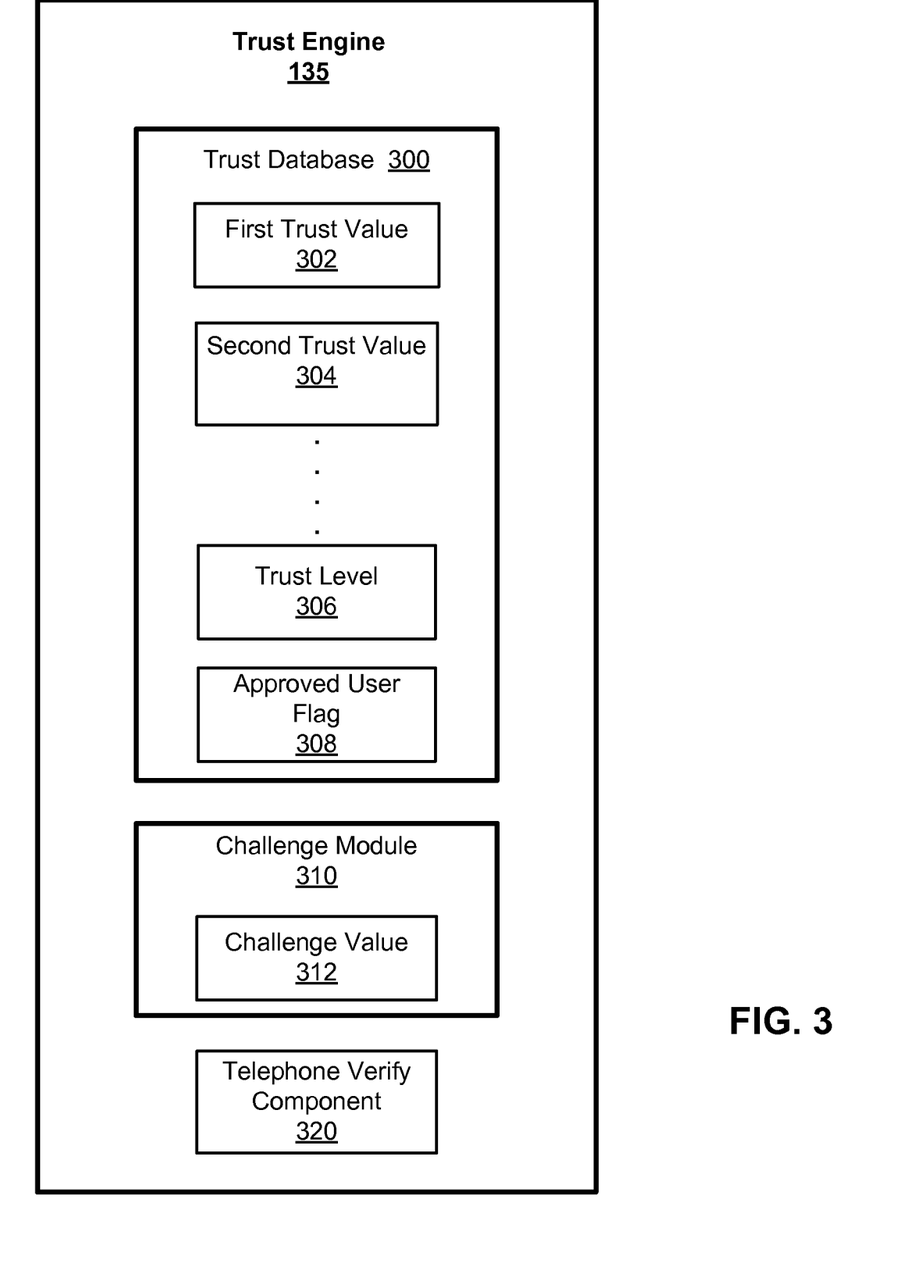
FIG. 3 is a block diagram of an exemplary trust engine.

FIG. 3 is a block diagram of an exemplary trust engine 135. The trust engine 135 includes a trust database 300, a challenge module 310 and a verify component 320. The trust database 300 is configured to store trust values and/or flags for users 102, which may be used, for example, to determine if the user 102 is an approved user 102A or a non-approved user 102N, to determine a trust level for a non-approved user 102N, and whether to promote the non-approved user 102N to the status of approved user 102A. The challenge module 310 determines whether to present a challenge to a user 102. The verify component 320 may receive personal information about a non-approved user 102N and change the non-approved user's 102N status to an approved user 102A. Although the trust engine 135 is described as being comprised of these components fewer or more components may comprise the trust engine 135 and still fall within the scope of various embodiments.

The trust database 300 includes a first trust value 302, a second trust value 304, a trust level 306, and a approved user flag 308. In some embodiments, the first trust value 302, the second trust value 304, the trust level 306, and the approved user flag 308 may be stored as entries in one or more databases. Although the trust database 300 is described as being comprised of these components, fewer or more components may comprise the trust database 300 and still fall within the scope of various embodiments. For example, the trust database 300 may include a third trust value or more trust values in addition to the first trust value 302 and the second trust value 304.

The first trust value 302 is a value that is based on the number of interactions of a first type between an approved user 102A and a non-approved user 102N. In some embodiments, the first trust value 302 may be an accumulator which is set to zero when the non-approved user 102N first joins the social network environment 100 and is incremented for each interaction of a first type. For example, the increment may be a number and the first trust value 302 may be incremented by that number for each interaction of a first type. In some embodiments, the number may be adjusted, for example, based on the trust level of the approved user 102A, or the affinity of the approved user 102A. Alternatively, the first trust value 302 may be calculated based on a function of the number of interactions, e.g., a polynomial, an exponential function, a stochastic function, and so forth.

The second trust value 304 is a value that is based on the number of interactions of a second type between the approved user 102A and the non-approved user 102N. The second trust value 304 may be calculated similarly to the first trust value 302. It is not necessary that the increment be the same for the second trust value 304 as for the first trust value 302. For example, the second trust value 304 may be incremented by half the number of the first trust value 302, for each interaction of a second type. It is not necessary that the function is the same for the second trust value 304 as the first trust value 302.

Some interactions between an approved user 102A and a non-approved user 102N are classified as first type interactions. For example, an invitation from an approved user 102A extended to a non-approved user 102N may be classified as a first type interaction. Likewise, an acceptance by the approved user 102A of an invitation from the non-approved user 102N to be a friend may also be classified as a first type interaction. The first trust value 302 may be a number based on the number of such first type interactions between various approved users 102A and a particular non-approved user 102N.

Likewise, some interactions between an approved user 102A and a non-approved user 102N are classified as second type interactions. For example, a tag by the approved user 102A of the non-approved user 102N in a photo may be classified as a second type interaction. In another example, a confirmation by the approved user 102A of a tag by the non-approved user 102N may be classified as a second type interaction. The second trust value 304 may be a number based on the number of such second type interactions between various approved users 102A and the particular non-approved user 102N.

Additionally, higher numbered type interactions are within the scope of the invention. Other interactions, for example, posting a message on the wall of a user 102, poking a user 102 and so forth, may be classified as first or second type interactions, or may be classified as higher numbered type interactions.

The trust level 306 represents a level of trust for a user 102. The trust level 306 is determined based on the first trust value 302 and the second trust value 304. For example, the first trust value 302 may be the sum of the first trust value 302 and the second trust value 304, or the sum of the first trust value 302 times a first weight and the second trust value 304 times a second weight. Alternatively, determination of the trust level 306 may include additional, higher numbered trust values, for example, a third trust value, a fourth trust value, and so forth. Other more complex functions of the first trust value 302 and the second trust value 304 may be used to determine the second trust value 304.

The approved user flag 308 indicates whether the user 102 is an approved user 102A. For example the approved user flag 308 may be set to true to indicate an approved user 102A and may be set to false to indicate a non-approved user 102N. The approved user flag 308 may be determined based on the first trust value 302, the second trust value 304, and/or the trust level 306.

In some embodiments, the approved user flag 308 may be set to true when the trust level 306 is greater than a trust level threshold, when the first trust value 302 is greater than a first trust threshold, when the second trust value 304 is greater than a second trust threshold, or any combination of these. The first trust threshold, the second trust threshold, and the trust level threshold may each be independently set to a zero or a non zero number, according to various embodiments. Alternatively, the approved user flag 308 may be determined based on additional, higher numbered trust values, for example, a third trust value, a fourth trust value, or more, as well as the first and second trust values. In some embodiments, a more complex function of the first trust value 302, the second trust value 304, and the trust level 306 may be used to determine the approved user flag 308.

The challenge module 310 includes a challenge value 312 and is configured to present a challenge to a user 102 to confirm that the user 102 is a human rather than a script or program. The challenge module 310 may be further configured to receive a response from the user 102 and use the response to determine if the user 102 is a human. Typically, the challenge is presented when a non-approved user 102N attempts to communicate with other users 102 and may be used to deter automated spam from scripts or programs. However, the challenge module 310 may present a challenge to any user 102, non-approved users 102N, approved users 102A, or some other group of users 102.

One form of challenge is the CAPTCHA, which is a type of challenge-response test used in computing to determine whether or not the user is human. A common type of CAPTCHA requires that the user 102 respond to the challenge by typing the letters of a distorted image, sometimes with the addition of an obscured sequence of letters or digits that appears on the screen. The challenge module 310 may present a challenge every time a user 102 requests communication with another user 102. Alternatively, the challenge module 310 may present the challenge periodically, e.g., every third time, every tenth time, etc. In some embodiments, the challenge module 310 may condition a decision to present the challenge based upon a probability calculation.

The challenge value 312 is used by the challenge module 310 to determine whether or not to challenge a user 102. The challenge value 312 may be based on the first trust value 302 the second trust value 304 the trust level 306 the approved user flag 308, or any combination thereof. In various embodiments, the challenge value 312 may also be based on additional, higher numbered trust values, for example, a third trust value, a fourth trust value, or more. One or more challenge value 312 may be stored for each user 102

In one example, a non-approved user 102N starts out with a first trust value 302, a second trust value 304, a trust level 306, all set to zero, and an approved user flag 308 set to false. The first trust value 302 is incremented 5 points for each approved user 102A who is not already a friend and becomes a friend of the non-approved user 102N. The second trust value 304 is incremented by 2 points each time the non-approved user 102N is tagged by any approved user 102A. The trust level 306 is a running total of the accumulating first trust value 302 and the accumulating second trust value 304.

When the trust level 306 is greater than some number, for example 100, and either the first trust value is greater than 30 or the second trust value is greater than 25, then the approved user flag 308 is set to true and the non-approved user 102N becomes an approved user 102A.

Each time the non-approved user 102N initiates a communication with any user 102 in the social network environment 100, the challenge module 310 determines whether to present a challenge to the non-approved user 102N. The challenge determination may be based on a probability calculation that is a product of the trust level 306 times a random number between 0 and 1. If the product is less than 50, then the challenge module 310 presents a challenge in the form of a CAPTCHA. The communication is allowed only if the non-approved user 102N responds correctly to the CAPTCHA. The forgoing example of calculating a trust value, setting an approved user flag, and determining whether to present a challenge to a user, is for illustrative purposes and not intended to be limiting.

The verify component 320 is configured to set the approved user flag 308 to true, if personal information about a non-approved user 102N is received. In one embodiment, the verify component 320 receives a telephone number from the non-approved user 102N and sends a message containing text, audio, images, video, etc., to a device coupled to the telephone number. The verify component 320 then receives a response from the non-approved user 102N and determines whether the response meets a predetermined criteria. For example, predetermined criteria may include matching the response to an expected text string contained in the message. When the response meets the predetermined criteria, the verify component 320 sets the approved user flag 308 to true, thus promoting the non-approved user 102N to approved user 102A status. Thus, the verify component 320 may confirm that the telephone number is personal information in control of the non-approved user 102N.

In some embodiments, the verify component 320 may confirm that the telephone number has not been used to verify another non-approved user 102N. In various embodiments, the verify component 320 may increment the first trust value 302, the second trust value 304, the trust level 306 and/or higher level trust values. Optionally, other forms of personal information may be received by the verify component 320, e.g., physical mailing address, a trusted email address, and so forth. In some embodiments, the verify component 320 may receive a telephone number associated with a telephone configured to receive text messages.

Figure 4:
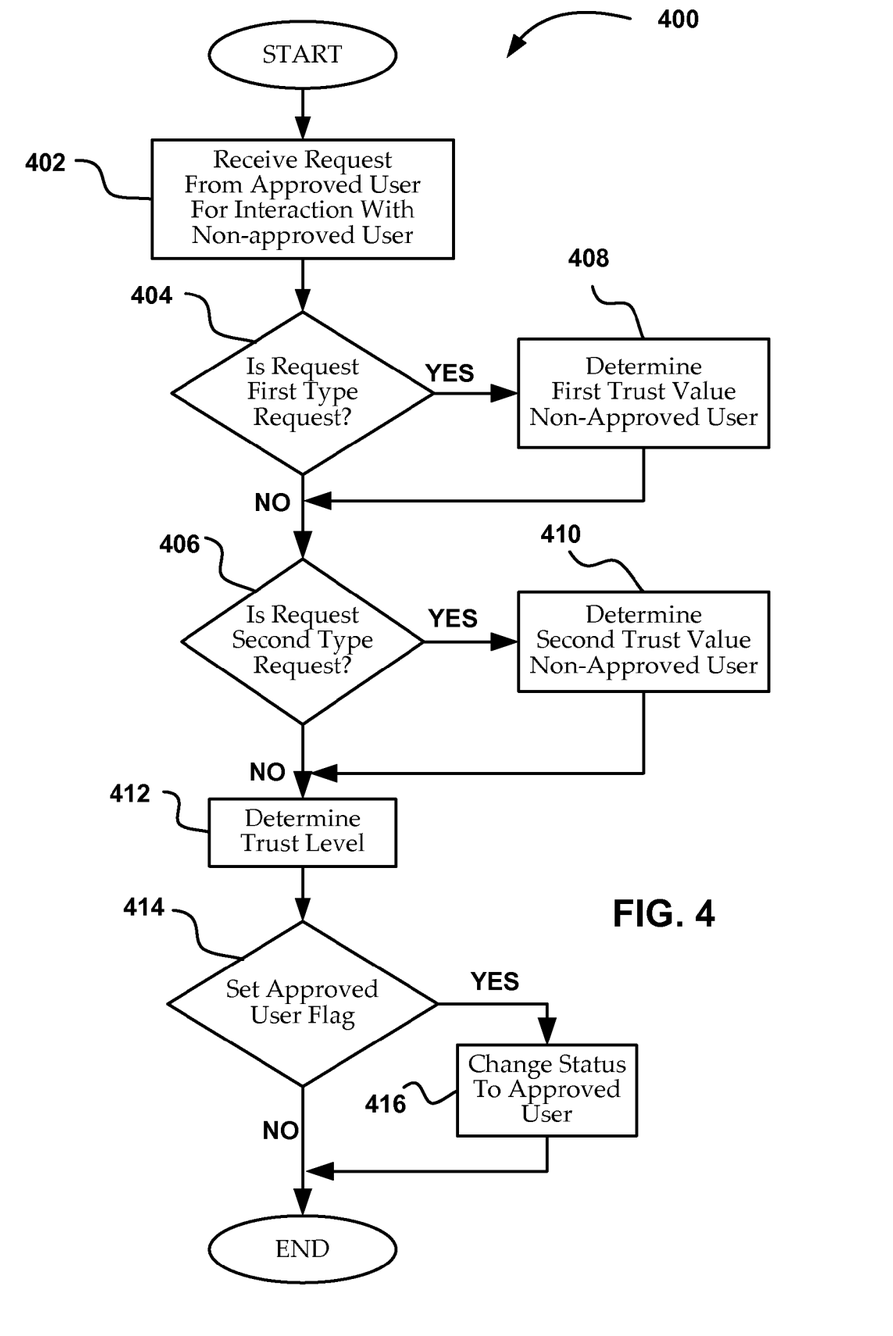
FIG. 4 is a flow diagram of an exemplary process for determining a trust level and setting an approved user flag.

FIG. 4 is a flow diagram of an exemplary process 400 for determining a trust level 306 and setting an approved user flag 308. In step 402 the social network provider 130 receives a request from an approved user 102A for an interaction with a non-approved user 102N of the social network. As above, examples of interactions requested by the approved user 102A include a request to the non-approved user 102N to become a friend, tagging the non-approved user 102N, and so forth.

In step 404 it is determined if the interaction requested is a first type request, for example, a request to the non-approved user 102N to become a friend. If the interaction requested is a first type interaction, the method proceeds to step 408. If the interaction requested is not a first type interaction, the method 400 proceeds to step 406.

In step 406 it is determined if the interaction requested is a second type interaction, for example a request to tag the non-approved user 102N. If the interaction requested is not a second type interaction the method 400 proceeds to step 412. If the interaction requested is a second type interaction, the method proceeds to step 410. Other requests for interactions may be classified as first type interactions or second type interactions, e.g., a request to poke a non-approved user 102N, a request to post a message on the wall of a non-approved user 102N, and so forth. The types are arbitrary, i.e., the request to the non-approved user 102N to become a friend and the request to tag the non-approved user 102N may be classified as second type interactions and first type interactions respectively, or any other desired classification.

In step 408, the first trust value 302 in the trust database 300 is determined. The determination may include increasing the first trust value 302 as above. Upon determining the first trust value 302, the method proceeds to step 408.

In step 410, the second trust value 304 in the trust database 300 is determined. Again, the determination may include increasing the second trust value 304. Upon determining the second trust value 304, the method proceeds to step 412.

In step 412, the trust level 306 is determined. As discussed elsewhere, the trust level 306 is based on the first trust value 302 and the second trust value 304.

In step 414, it is determined whether to set the approved user flag 308 to true. As discussed elsewhere, setting the approved user flag 308 may be based on the first trust value 302 and the second trust value 304. If the approved user flag is not set at step 414, the method 400 ends. If the approved user flag is set at step 414, the method 400 proceeds to step 416.

In step 416, the status of the non-approved user 102N is changed to the status of approved user 102A. After step 416, the method 400 ends.

Figure 5:
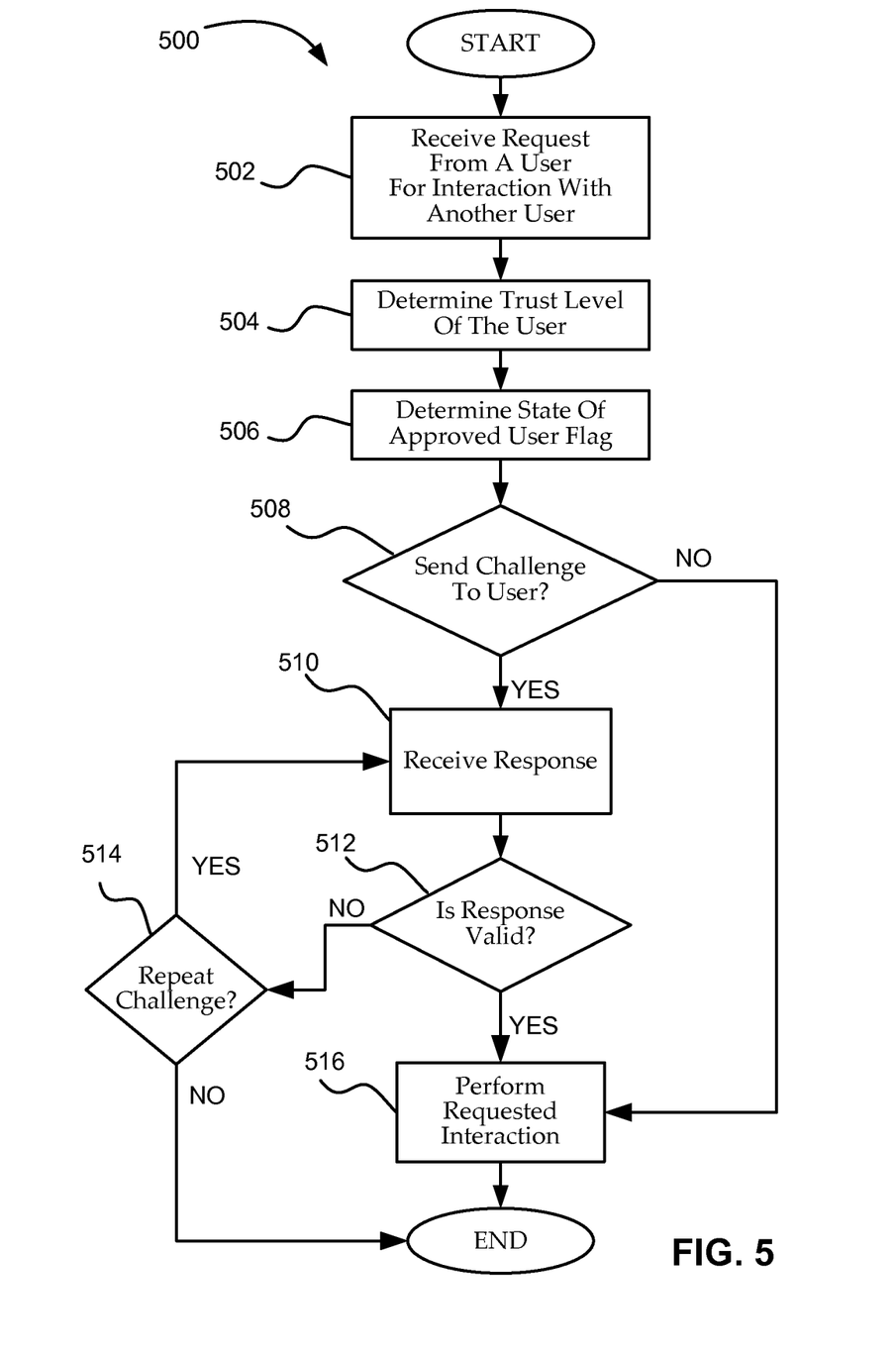
FIG. 5 is a flow diagram of an exemplary process for challenging a user.

FIG. 5 is a flow diagram of an exemplary process 500 for challenging a user 102. In step 502, a request is received by the social network provider 130 from a user 102 for an interaction with another user 102. In various embodiments, the request may be received from an approved user 102A, a non-approved user 102N or a user 102 belonging to another group.

In optional step 504, the trust level 306 may be determined for the user 102 as discussed elsewhere herein. In optional step 506, the state of the approved user flag 308 may be determined, as discussed elsewhere herein.

In step 508, it is determined whether to send a challenge to the user 102. The determination may be based on the trust level 306 and/or the state of the approved user flag 308. For example, an approved user 102A may be exempt from a challenge. Alternatively, as above, the determination to present a challenge may be based on a probability calculation that includes the trust level 306 for the user 102. In some embodiments, the user 102 may be challenged periodically, e.g., every fourth or twelfth time. If it is determined not to challenge the user 102, then the method 500 proceeds to step 516. If it is determined to challenge the user 102, then the method proceeds to step 510.

In step 510, a response is received to the challenge from the user 102. The challenge may be a CAPTCHA, as discussed elsewhere. Alternatively, the challenge may include a question about a friend in the social network environment 100, or personal information in the user's profile database 202.

In step 512, it is determined if the response is valid. If the response is valid, the method proceeds to step 516. If the response is not valid, the method proceeds to step 514.

In step 514, it is determined whether to repeat the challenge. In some embodiments, the challenge may be repeated a predetermined number of times, e.g. 0, 1, 2, 10, or more. Alternatively, the decision to repeat the challenge may be based on a comparison of the response to a valid response. If it is determined in step 514 not to repeat the challenge, the method 500 ends and the requested interaction is not performed. If it is determined to repeat the challenge in step 514, the method 500 returns to step 510 where the same or another challenge may be presented to the user 102.

In step 516, the requested interaction is performed after a valid response is received. In some embodiments, the first trust value 302, the second trust value 304, or a higher level trust value may be incremented at step 516. Upon completion of step 516, the method 500 ends.

Figure 6:
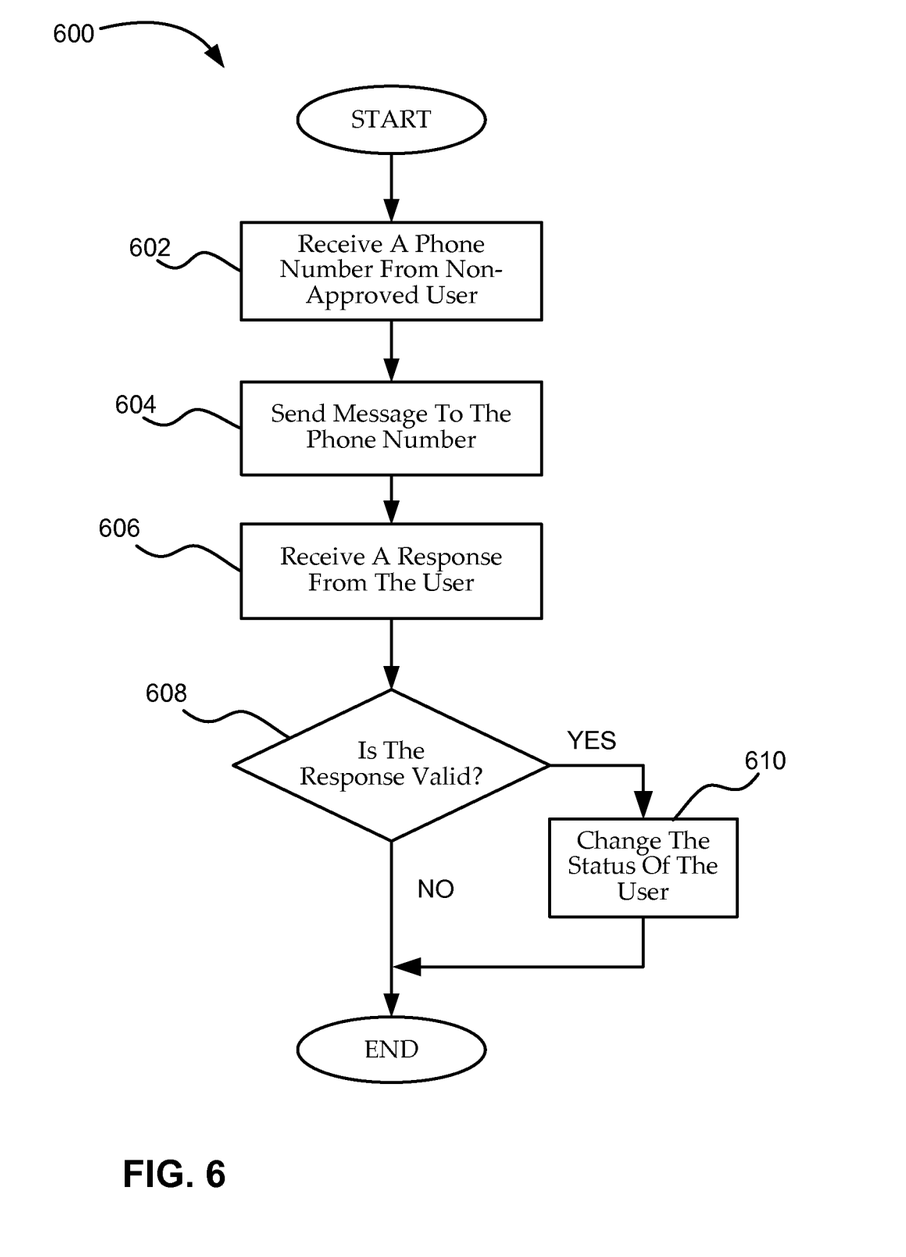
FIG. 6 is a flow diagram of an exemplary process for changing the status of a non-approved user.

FIG. 6 is a flow diagram of an exemplary process 600 for changing the status of a non-approved user 102N. In step 602, a telephone number is received, e.g., by the verify component 320, from the non-approved user 102N. In various embodiments, the telephone number may be for a wireless telephone (e.g., a cell phone), a telephone connected to a land line, a pager, and so forth.

In step 604, the verify component 320 sends a message to a device at the telephone at the telephone number received. The message may be a text message, a voice message, a numeric message, a video message, or a combination thereof. The non-approved user 102N may receive the message via voice mail, a telephone configured to display alpha and/or numeric strings, a pager configured to display alpha and/or numeric strings, a personal digital assistant (PDA), etc.

In step 606, the verify component 320 receives a response from the non-approved user 102N.

In step 608, the verify component 320 determines if the response is valid, e.g., meets a predetermined criteria. For example, the response may be compared to an expected text string and determined to be valid when the response contains the predetermined text string. In some embodiments, the message may include a CAPTCHA containing the expected text string. If the response is not valid, the method 600 ends. If the response is valid, the method 600 proceeds to step 610.

In step 610, the verify component 320 changes the status of the non-approved user 102N to a status of an approved user 102A. For example, the verify component 320 may set the approved user flag 308 to true. Alternatively, the verify component 320 may increment the trust level 306, and/or the first trust value 302, and/or the second trust value 304. Upon changing the status of the non-approved user 102N to the status of approved user 102A at step 610, the method 600 ends.

Several embodiments are specifically illustrated and/or described herein. However, it will be appreciated that modifications and variations are covered by the above teachings and within the scope of the appended claims without departing from the spirit and intended scope thereof. For example, the CAPTCHA may include advertising. For example, the trust level may be based on the affinity of one or more approved users for a non-approved user. Various embodiments of the invention include logic stored on computer readable media, the logic configured to perform methods of the invention.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
   maintaining a trust level for each of a plurality of users of a social networking system, wherein each user's trust level represents a global trustworthiness of the user in the social networking system;
   receiving a telephone number from a user of the plurality of users;
   sending a message to a device associated with the telephone number;
   receiving a response to the message;
   determining if the response meets a criterion;
   confirming that personal information under the control of the user has not been used to verify another user of the social networking system;
   increasing, by a computer system of the social networking system, a trust level associated with the user if the response meets the criterion and if the personal information under the control of the user has not been used to verify another user of the social networking system;
   receiving a request from the user to send a message to one or more other users via the social networking system; and
   determining whether to allow the request to send the message based on the trust level maintained by the social networking system for the requesting user.

2. The method of claim 1, wherein the message is selected from the group consisting of a text message, a voice message, a numeric message, and a video message.

3. The method of claim 1, wherein the criterion comprises receiving the response within a predetermined period of time after the message is sent.

4. The method of claim 1, wherein the criterion comprises whether the response matches an expected text string.

5. The method of claim 4, wherein the expected text string is an answer to a CAPTCHA.

6. The method of claim 1, further comprising, prior to increasing the trust level, confirming that the telephone number has not been used to verify another user of the social networking system.

7. The method of claim 1, wherein the telephone number is received over the Internet.

8. The method of claim 1, wherein the response is received over the Internet.

9. The method of claim 1, wherein the message is an image.

10. The method of claim 1, wherein increasing the trust level associated with the user results in changing a status of the user from a non-approved user associated with a lower trust level to an approved user associated with a higher trust level.

11. A method comprising:
    maintaining a trust level for each of a plurality of users of a social networking system, wherein each user's trust level represents a global trustworthiness of the user in the social networking system;
    determining whether a user of the plurality of users can be verified via a telephone number associated with the user, comprising:
       comparing a response received at the social networking system from a device associated with the telephone number to a criterion for the response; and
       responsive to the response meeting the criterion, verifying the user;
    confirming that personal information under the control of the user has not been used to verify another user of the social networking system;
    increasing, by a computer system of the social networking system, a trust level associated with the user in response to the verifying, increasing only if the personal information under the control of the user has not been used to verify another user of the social networking system;
    receiving a request from the user to send a message to one or more other users via the social networking system; and
    determining whether to allow the request to send the message based on the trust level maintained by the social networking system for the requesting user.

12. The method of claim 11, wherein the response is selected from the group consisting of a text message, a voice message, a numeric message, and a video message.

13. The method of claim 11, wherein the criterion comprises whether the response matches an expected text string.

14. The method of claim 13, wherein the expected text string is an answer to a CAPTCHA.

15. The method of claim 11, further comprising, prior to increasing the trust level, confirming that the telephone number has not been used to verify another user of the social networking system.

16. The method of claim 11, wherein the response is received over the Internet.

17. A method comprising:
- maintaining a trust level for each of a plurality of users of a social networking system, wherein each user's trust level represents a global trustworthiness of the user in the social networking system;
- determining whether a user of the plurality of users can be verified via personal information under the control of the user, comprising:
  - comparing a response received at the social networking system from a device associated with the personal information under the control of the user to a criterion for the response; and
  - responsive to the response meeting the criterion, verifying the user;
- confirming that personal information under the control of the user has not been used to verify another user of the social networking system;
- increasing, by a computer system of the social networking system, a trust level associated with the user in response to the verifying, increasing only if the personal information under the control of the user has not been used to verify another user of the social networking system;
- receiving a request from the user to send a message to one or more other users via the social networking system; and
- determining whether to allow the request to send the message based on the trust level maintained by the social networking system for the requesting user.

18. The method of claim 17, wherein the personal information under the control of the user is a telephone number.

19. The method of claim 17, wherein the personal information under the control of the user is a physical mailing address.

20. The method of claim 17, wherein the personal information under the control of the user is a trusted email address.

21. The method of claim 17, wherein the response is selected from the group consisting of a text message, a voice message, a numeric message, and a video message.

22. The method of claim 17, wherein the criterion comprises whether the response matches an expected text string.

23. The method of claim 22, wherein the expected text string is an answer to a CAPTCHA.

24. The method of claim 17, further comprising, prior to increasing the trust level, confirming that personal information under the control of the user has not been used to verify another user of the social networking system.

25. The method of claim 17, wherein the response is received over the Internet.

* * * * *